United States Patent
Gehl et al.

(10) Patent No.: US 11,163,115 B1
(45) Date of Patent: Nov. 2, 2021

(54) OPTICAL COUPLER FOR HETEROGENEOUS INTEGRATION

(71) Applicant: National Technology & Engineering Solutions of Sandia, LLC, Albuquerque, NM (US)

(72) Inventors: Michael Gehl, Albuquerque, NM (US); Gregory A. Vawter, Corrales, NM (US); Galen Hoffman, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 37 days.

(21) Appl. No.: 16/902,429

(22) Filed: Jun. 16, 2020

(51) Int. Cl.
*G02B 6/122* (2006.01)
*G02B 6/12* (2006.01)

(52) U.S. Cl.
CPC ....... *G02B 6/1228* (2013.01); *G02B 6/12004* (2013.01); *G02B 2006/12069* (2013.01); *G02B 2006/12121* (2013.01)

(58) Field of Classification Search
CPC .............. G02B 6/1228; G02B 6/12002; G02B 6/12004; G02B 6/12121; G02B 6/12069; G02B 6/138; G02B 2006/12121; G02B 2006/12142; G02B 2006/12061
See application file for complete search history.

(56) References Cited

U.S. PATENT DOCUMENTS

| | | | | |
|---|---|---|---|---|
| 6,229,947 B1* | 5/2001 | Vawter | ................. | G02B 6/1228 385/131 |
| 6,768,855 B1* | 7/2004 | Bakke | ................. | G02B 6/1228 385/129 |
| 9,599,781 B1* | 3/2017 | Skogen | ................. | G02B 6/1226 |
| 9,772,447 B2* | 9/2017 | Keyvaninia | .............. | G02B 6/14 |
| 10,509,164 B2* | 12/2019 | Lebby | .................. | G02B 6/1221 |
| 10,989,871 B2* | 4/2021 | Becker | .................. | G02B 6/132 |
| 2018/0081118 A1* | 3/2018 | Klamkin | .............. | G02B 6/4208 |
| 2020/0026005 A1* | 1/2020 | Lipson | ..................... | G02B 6/30 |

OTHER PUBLICATIONS

Heck, M.J.R. et al., "Hybrid Silicon Photonic Integrated Circuit Technology," IEEE Journal of Selected Topics in Quantum Electronics (2013) 19(4):6100117, 17 pages.

Liang, D. et al., "Recent progress in lasers on silicon," Nature Photonics (2010) 4(8):511-517.

(Continued)

*Primary Examiner* — Ryan A Lepisto
*Assistant Examiner* — Erin D Chiem
(74) *Attorney, Agent, or Firm* — Martin I. Finston (57) ABSTRACT

In an optical apparatus, an introduced semiconductor device is heterointegrated on a silicon-based platform containing a silicon-based waveguide. A polymeric waveguide is optically coupled to the introduced semiconductor device and overlies at least a portion of the silicon-based waveguide. The polymeric waveguide is conformed as a multimode interference (MMI) coupler between the introduced semiconductor device and the silicon-based waveguide. At least the polymeric waveguide, and in embodiments, also the silicon-based waveguide, is tapered with a shape that effectuates optical coupling to the silicon-based waveguide.

19 Claims, 11 Drawing Sheets

(56) References Cited

OTHER PUBLICATIONS

Stankovic, S. et al., "1310-nm Hybrid III-V/Si Fabry-Perot Laser Based on Adhesive Bonding," IEEE Photonics Technology Letters (2011) 23(23):1781-1783.

Roelkens, G. et al., "III-V/Si photonics by die-to-wafer bonding," Materials Today (2007) 10(7-8):36-43.

Lamponi, M. et al., "Heterogeneously integrated InP/SOI laser using double tapered single-mode waveguides through adhesive die to wafer bonding," 7th IEEE International Conference on Group IV Photonics (2010), Sep. 1-3, p. 22-24.

Roelkens, G. et al., "Laser emission and photodetection in an InP/InGaAsP layer integrated on and coupled to a Silicon-on-Insulator waveguide circuit," Optics Express (2006) 14(18):8154-8159.

Shani, Y. et al., "Efficient coupling of a semiconductor laser to an optical fiber by means of a tapered waveguide on silicon," Applied Physics Letters (1989) 55(23):2389-2391.

Lamponi, M. et al., "Low-Threshold Heterogeneously Integrated InP/SOI Lasers With a Double Adiabatic Taper Coupler," IEEE Photonics Technology Letters (2012) 24(1):76-78.

Vawter, G.A. et al., "Tapered Rib Adiabatic Following Fiber Couplers in Etched GaAs Materials for Monolithic Spot-Size Transformation," IEEE Journal of Selected Topics in Quantum Electronics (1997) 3(6):1361-1371.

Shoji, T. et al., "Low loss mode size converter from 0.3 mu m square Si wire waveguides to single mode fibres," Electronics Letters (2002) 38(25):1669-1670.

Niklaus, F. et al., "Adhesive wafer bonding," Journal of Applied Physics (2006) 99(3):031101, 29 pages.

Roelkens, G. et al., "Adhesive Bonding of InP/InGaAsP Dies to Processed Silicon-On-Insulator Wafers using DVS-bis-Benzocyclobutene," Journal of the Electrochemical Society (2006) 153(12):G1015-G1019.

Soldano, L.B. et al., "Optical Multi-Mode Interference Devices Based on Self-Imaging: Principles and Applications," Journal of Lightwave Technology (1995) 13(4):615-627.

Gallagher, D.F.G. et al., "Eigenmode Expansion Methods for Simulation of Optical Propagation in Photonics—Pros and Cons," Proc. SPIE vol. 4987, Integrated Optics: Devices, Materials, and Technologies VII (2003) Integrated Optoelectronics Devices, San Jose, CA, pp. 69-82.

Fang, A. W.-L., "Silicon Evanescent Lasers," Doctoral Dissertation, Dept. of Electrical and Computer Engineering, University of California at Santa Barbara, Mar. 2008, Chapters 1-3, pp. 1-71.

Park, H. et al., "Photonic Integration on the Hybrid Silicon Evanescent Device Platform," Advances in Optical Technologies, Special Issue on Silicon Photonics (2008) Article ID 682978, 17 pages, https://doi.org/10.1155/2008/682978.

Stankovic, S. et al., "1310 nm Evanescent Hybrid III-V/Si Laser Based on DVS-BCB Bonding," Integrated Photonics Research, Silicon and Nano-Photonics (IPR), Canada, p. IWC3 doi:10.1364/iprsn.2011.iwc3 (2011) 3 pages.

Roelkens, G. et al., "III-V-on-Silicon Photonic Devices for Optical Communication and Sensing," Photonics (2015) 3: 969-1004; https://doi.org/10.3390/photonics2030969.

Roelkens, G. et al., "High efficiency Silicon-on-Insulator grating coupler based on a poly-Silicon overlay," Optics Express (2006) 14(24):11622-11630; https://doi.org/10.1364/OE.14.011622.

Kopperschmidt, P. et al., "High bond energy and thermomechanical stress in silicon on sapphire wafer bonding," Appl. Phys. Lett. (1997) 70(22):2972-2974.

Kopperschmidt, P. et al., "Wafer bonding of gallium arsenide on sapphire," Appl. Phys. A: Mater. Sci. Process. (1997) 64:533-537.

Amin, S. et al., "Multimode Interference (MMI) Devices—A Survey," FIT '10: Proceedings of the 8th International Conference on Frontiers of Information Technology, Dec. 21-23, 2010, Islamabad, Pakistan, Article No. 46, pp. 1-6; https://doi.org/10.1145/1943628.1943674.

Roelkens, G. et al., "Coupling Schemes for Heterogeneous Integration of III-V Membrane Devices and Silicon-on-Insulator Waveguides," J. Lightwave Technol. (2005) 23(11):3827-3831.

\* cited by examiner

OPTICAL COUPLER FOR HETEROGENEOUS INTEGRATION

STATEMENT OF GOVERNMENT RIGHTS

This invention was made with United States Government support under Contract No. DE-NA0003525 between National Technology & Engineering Solutions of Sandia, LLC and the United States Department of Energy/National Nuclear Security Administration. The United States Government has certain rights in this invention.

FIELD OF THE INVENTION

This invention relates to optoelectronic devices and components, and more particularly, to the heterointegration of such devices and components.

ART BACKGROUND

Silicon-based platforms for processing optical signals have attracted widespread attention because their material costs are relatively low, and because they are manufacturable using well-established methods such as CMOS processes and the like. Because silicon has an indirect bandgap, however, it has been necessary to turn to other materials, such as III-V semiconductors, as a basis for lasers and other active photonic devices. Because of that, there is growing interest in heterointegration (HI); that is, in integrating optical devices on a common platform although they have been fabricated in different material systems.

Developers in the field of HI have been particularly interested in the heterogeneous photonic integration of III-V compound semiconductor photonics with silicon photonics. A pressing need in that area has been for improved technologies to couple light in the vertical direction between waveguides formed in a silicon-based platform and III-V devices bonded onto that platform.

In a known approach, for example, indium phosphide-based semiconductors are directly wafer bonded onto silicon and silicon oxide surfaces using covalent atomic bonding. That approach is discussed, for example, in D. Liang et al., "Recent progress in lasers on silicon," Nature Photonics 4(8) (2010) 511-517. Using techniques of that kind, active optical devices such as lasers can be evanescently coupled through hybrid optical waveguides that combine III-V material with silicon.

One drawback of that technique, however, is that to permit evanescent coupling, the semiconductor undercladding that supports the laser-diode drive currents must be optically thin. This leads to very high series electrical resistance and low efficiency.

Another drawback is the difficulty of achieving surfaces that are smooth enough for bonding. Moreover, the bonded interface between the two material systems in typical geometries bisects the hybrid optical mode, making the resulting devices highly susceptible to interface-induced optical losses and manufacturing process variations.

Yet another drawback is a lack of interchangeability, because currently, designs suitable for evanescent coupling tend to be specialized to one type of III-V device and one choice of III-V material.

In view of those drawbacks, developers in this field have recognized the potential advantages that would follow if HI could be achieved without an explicit dependence on evanescent optical coupling or on optical waveguide modes, which we refer to as "hybrid modes", that are guided by a heterogeneous material stack.

Such an approach is proposed in G. Roelkens et al., "Laser emission and photodetection in an InP/InGaAsP layer integrated on and coupled to a Silicon-on-Insulator waveguide circuit," Optics Express 14(18) (2006) 8154-8159, hereinafter referred to as Roelkens 2006. In the approach of Roelkens 2006, a III-V laser is bonded to the silicon photonic chip using a thin adhesive polymer layer of benzocyclobutene (BCB). At about 600 nm, the n-type undercladding is thicker than what would typically be used in evanescently coupled devices, but is still relatively thin. (For example, 600 nm is only about 0.4 times a vacuum wavelength of 1550 nm, and, very roughly, about one wavelength within an III-V material.)

In the Roelkens 2006 device, the III-V taper is replaced by an abruptly etched facet. Light at 1550 nm wavelength exits the facet and couples into the fundamental mode of a polyimide polymer waveguide from which it is then coupled vertically downward into a tapered waveguide in the lower silicon photonic layer. Simulations predicted a coupling loss, for 1550-nm light from an InGaAsP laser on silicon, of 0.8 dB, exclusive of the interface Fresnel loss.

The Roelkens approach may be understood further from G. Roelkens et al., "Coupling Schemes for Heterogeneous Integration of III-V Membrane Devices and Silicon-on-Insulator Waveguides," J. Lightwave Technology 23 (11) (November 2005) 3827-3831, hereinafter referred to as Roelkens 2005.

Although useful, the Roelkens approach is limited in the range of possible designs because it requires optical single-mode operation. Further improvements in coupling efficiency as well as even thicker n-type under cladding for improved electrical and thermal properties would also be desirable. Accordingly, there is a need for further approaches to HI that achieve vertical coupling with greater efficiency, improved laser performance, and greater flexibility in device design.

SUMMARY OF THE INVENTION

We have devised such an approach. Like Roelkens 2006, our approach also effectuates vertical coupling by using an intermediary waveguide situated out-of-plane relative to the lower silicon-based optical-waveguide layer. (As used herein, the term "silicon-based" is meant to include devices fabricated on silicon and SOI wafers, as well as devices that include layers of silicon, silicon dioxide, silicon nitride, other silicon compounds, and other materials that are compatible with standard techniques of silicon semiconductor processing.)

Unlike Roelkens 2006, however, our intermediary waveguide is a multimode interference (MMI) coupler. In particular embodiments, moreover, the optical modes are transferred non-adiabatically between the lower silicon-system waveguide and the upper level. Typically, the upper level will include a III-V device. In examples, the III-V device is an active device such as a laser, optical amplifier, or modulator.

The upper level is not limited to III-V devices, however. In one important example, the optically coupled component in the upper level is a layer of an optically active material such as lithium niobate. In the discussion below, we will generally refer to the upper level as a "III-V level" or the like. This is merely illustrative and should not be understood as limiting the upper-level composition in any way.

The intermediary waveguide is exemplarily a polymeric waveguide made from a material such as polyimide. In example implementations, our silicon-based waveguide is made of silicon nitride.

To effectuate the non-adiabatic transfer of optical modes, both the intermediary waveguide and the silicon-based waveguide are tapered. Both waveguides are tapered laterally, i.e. in a plane parallel to the substrate. The intermediary waveguide may also have a vertical taper.

Numerical simulation of our new designs has predicted that coupling losses less than 1 dB are achievable. Our designs relax the constraints on the thickness of the intermediary waveguide. One important feature of our new designs is that the intermediary waveguide is made to be multimodal in the vertical dimension.

As is known in the art, the existence of higher-order guided modes can generally be predicted from the product of the core waveguide thickness times the square root of the index contrast, i.e., of the core-to-cladding refractive index difference.

Thus, vertical confinement to single-mode propagation generally relies on some combination of low waveguide thickness and low index contrast. By contrast, an intermediary waveguide would be expected to be multimodal in the vertical direction if it were relatively thick and/or if there were a relatively great difference in refractive index between the core and the cladding.

In evanescently coupled designs, the III-V undercladding is limited in thickness to about an optical wavelength or less. In our design, by contrast, the vertical coupling through an intermediary waveguide allows a laser or other active III-V device to have a relatively thick undercladding. For example, our approach may permit undercladding thicknesses of two or more (in-material) wavelengths, and even thicknesses of five wavelengths or more.

Although this can be the case even when the intermediary waveguide is single mode, there are even greater possibilities with a multimode intermediary waveguide. It may even be possible, in embodiments, to include an ohmic metal contact on the bottom side of the undercladding directly beneath the gain region. For example, our approach may permit undercladding thicknesses of two or more (in-material) wavelengths, and even thicknesses of five wavelengths or more, as well as an underlying metal layer.

Another advantage of our design is that because it does not rely on evanescent coupling, it can use adhesive bonding to cover rough surfaces, and even to cover topological features such as metal lines.

Adhesive bonding, in turn, relaxes the requirements for material compatibility between the respective heterointegrated layers. Hence, a silicon-based substrate, for example, can be integrated with any of various material systems. Among the III-V materials, candidate systems include, without limitation, those of the III-phosphides, the III-arsenides, and the III-nitrides. As mentioned above, candidate materials outside of the III-V systems include lithium niobate, among others.

Accordingly, embodiments of the invention relate to a silicon-based platform containing a silicon-based waveguide, for example a silicon or silicon nitride waveguide. A "silicon-based" platform is constituted by a silicon or SOI wafer or the like, or any other platform on which fabrication of components from silicon and silicon compounds can be practiced.

An "introduced" semiconductor device, i.e., a device that was not fabricated directly in the silicon-based platform, is heterointegrated on the silicon-based platform. A polymeric waveguide is optically coupled to the introduced semiconductor device and overlies at least a portion of the silicon-based waveguide. The polymeric waveguide is conformed as a multimode interference (MMI) coupler between the introduced semiconductor device and the silicon-based waveguide.

At least the polymeric waveguide, and in embodiments, also the silicon-based waveguide, is tapered with a shape that effectuates optical coupling to the silicon-based waveguide. In some embodiments, the taper is non-adiabatic. In some embodiments, the polymeric waveguide and the silicon-based waveguide are both tapered with non-adiabatic tapers that effectuate optical coupling between said polymeric waveguide and said silicon-based waveguide.

In some embodiments, the shape that effectuates optical coupling to the silicon-based waveguide has undulant sidewalls. The shape having undulant sidewalls may, for example, be a product of adjoint shape optimization.

In embodiments, the introduced semiconductor device is a III-V laser or other active III-V optoelectronic device.

In embodiments, an adhesion layer joins the introduced III-V device to the silicon-based platform.

In some embodiments, the polymeric waveguide comprises polyimide. In some embodiments, the silicon-based waveguide comprises silicon nitride.

In some embodiments, the polymeric waveguide is arranged for lateral optical coupling with the introduced semiconductor device and for vertical optical coupling with the silicon-based waveguide. In some embodiments, the polymeric waveguide has a horizontal midplane and is arranged such that optical coupling between the polymeric waveguide and the introduced semiconductor device is effectuated principally at a height above the midplane.

In embodiments, the introduced semiconductor device is a III-V laser with at least one operating frequency, the introduced semiconductor device has an undercladding with a thickness light at the operating frequency has an in-material wavelength $\lambda_m$ within the undercladding, and the thickness τ is at least twice the wavelength $\lambda_m$.

In embodiments, the introduced semiconductor device comprises an undercladding and a metal contact layer that underlies the undercladding.

In some embodiments, the taper is less than 200 μm long, and may even be less than 100 μm long. In some embodiments, the introduced semiconductor device is a III-V laser adapted for operation in the wavelength range from 1.5 μm to 1.6 μm, and the taper is less than 200 μm long, or even less than 100 μm long.

BRIEF DESCRIPTION OF THE DRAWINGS

FIGS. 2, 3A, and 3B illustrate a transition of optical energy from an upper polymer waveguide to a lower silicon-layer waveguide in an example of a double taper according to the principles described here. In these figures, the mode profile within the waveguiding structure is shown in a cross-sectional contour plot at various positions along the z-axis, which in the drawing is the longitudinal axis of the double taper. These figures were generated by numerical simulation.

DETAILED DESCRIPTION

The challenge of coupling light between III-V and silicon device structures is rooted in the dissimilar sizes of optical modes, the alignment precision needed to achieve acceptable coupling, and the requirement that the III-V device be electrically injected or biased with low parasitic resistive losses. In much of the prior art, waveguides and devices work with the fundamental mode (which has the highest modal refractive index of any mode), and coupling is effectuated using adiabatic mode transformations.

In an adiabatic mode transformation, light propagates through a region of changing physical properties such as size or refractive index without causing energy to transfer among the various local normal modes of the system. Generally, an adiabatic mode transformer is implemented as a long taper in which one waveguide gradually becomes narrower. This causes the local fundamental mode to change in size, and it can shift the bulk of the energy of the optical field upward or downward into layers of dissimilar materials.

In Roelkens 2006, a III-V laser is bonded to a silicon photonic chip using a thin BCB adhesive polymer layer. The n-type undercladding is increased in thickness to about 600 nm. Instead of a taper, the laser terminates in an abruptly etched facet. Light at 1550-nm wavelength exits the facet and couples into the fundamental mode of a polyimide polymer waveguide. From there, the light is coupled down into the lower tapered silicon photonic layer.

Roelkens 2006 reported that with this approach, simulations predicted coupling losses of 0.8 dB (exclusive of the interface Fresnel loss) for a 1550-nm wavelength InGaAsP laser on silicon.

The entirety of Roelkens 2006 and the entirety of Roelkens 2005 are hereby incorporated herein by reference.

Our new approach extends the ideas of Roelkens 2005 and Roelkens 2006 in at least the following respects:

(1) The (intermediary) polymer waveguide is conformed as a multimode waveguide;

(2) The polymer waveguide is dimensioned at least in the vertical direction to be multimode; and (3) The polymer waveguide is designed to serve as a multimode interference coupler for directing the light intensity within the polymer downward toward the silicon-based wafer.

In addition, some embodiments incorporate one or more of the following features:

(4) The width of at least the polymer waveguide is tapered non-adiabatically;

(5) The laser or other active III-V device can have an optically thick undercladding; and (6) A metallic electrical contact layer can be included beneath the undercladding.

Figure 1:
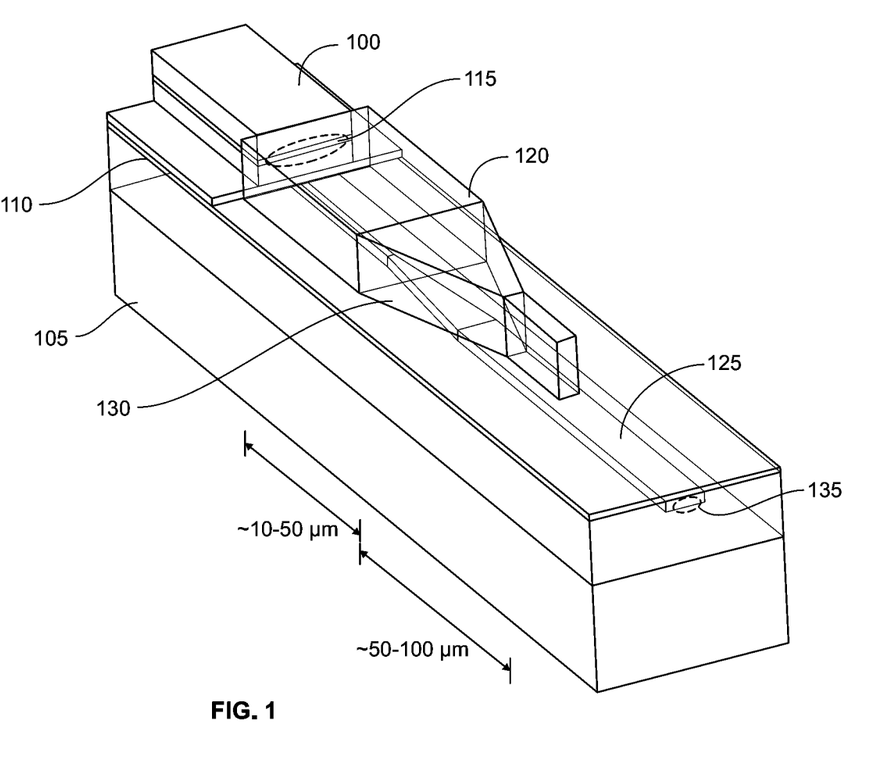
FIG. 1 is a cartoon drawing in perspective view. The drawing notionally illustrates an example embodiment of the present invention, in which a polymer-bonded III-V semiconductor optical amplifier (SOA) is heterointegrated on a silicon photonic wafer.

FIG. 1 is a notional illustration of an example device of the kind described here. As shown in the figure, an III-V semiconductor optical amplifier (SOA) 100, which is provided as a non-limiting example of an upper-level device or element, is polymer bonded onto a silicon photonic wafer 105. A typical polymer adhesive is BCB (benzocyclobutene) 110, as indicated in the drawing. (In examples, the BCB can be used in the form of a copolymer with divinyltetramethyldisiloxane, as is well known in the art. In that chemical form, the adhesive is sometimes referred to as "DVS-BCB".)

In operation, the III-V optical mode 115 exits the SOA directly and abruptly into a butt-coupled polymer waveguide 120 made, for example, of polyimide. The III-V optical mode exits the SOA without a substantial amount of direct coupling of the optical field between the SOA and the silicon waveguide 125.

Upon entering the polymer waveguide, optical energy is coupled into multiple guided modes. The optical field strength and phase in each of these modes is dictated by the shape of the excitation field exiting the SOA.

As the multimodal optical field propagates through the polymer waveguide, the relative phases of the various modes evolve. As a consequence, the local intensity pattern evolves as well. At a point where the relative phases of the modes are favorably distributed, a taper 130 is initiated by increasing the width of the lower silicon waveguide 125 and decreasing the width of the upper polyimide waveguide.

The object of the taper is to modify the respective modal profiles in such a way that energy will progressively couple into modes favoring the capture of optical energy 135 in the silicon layer at the expense of other types of modes. Although adiabatic tapers may be effective for this purpose, our numerical studies predict good results with tapers that are non-adiabatic. Non-adiabatic tapers are generally shorter than adiabatic tapers, and they generally effectuate mode transformations over less propagation distance and less propagation time.

More specifically, our simulations have predicted that at a wavelength of 1550 nm, non-adiabatic tapers can effectively transfer optical power within a length of less than 200

μm. Our simulations also showed that the coupling loss can be well below 1 dB and that fabrication tolerances are acceptable.

We also found that downstream of the transition of the optical mode from the upper polymer waveguide to the lower silicon-layer waveguide, we could generally modify the width of the upper waveguide without a significant impact on the performance of the device. We found, likewise, that downstream of the transition, we could modify the width of the lower waveguide, at least within limits, without a significant penalty in performance. This was an advantage when interfacing with planar lightwave circuit (PLC) designs with a standardized waveguide width of 1.2 μm, for example. The lower taper width might be greater than (or less than) 1.2 μm at the end of the transition region, but we had the design flexibility to taper down (or up) to a matching width of 1.2 μm.

Figure 2:
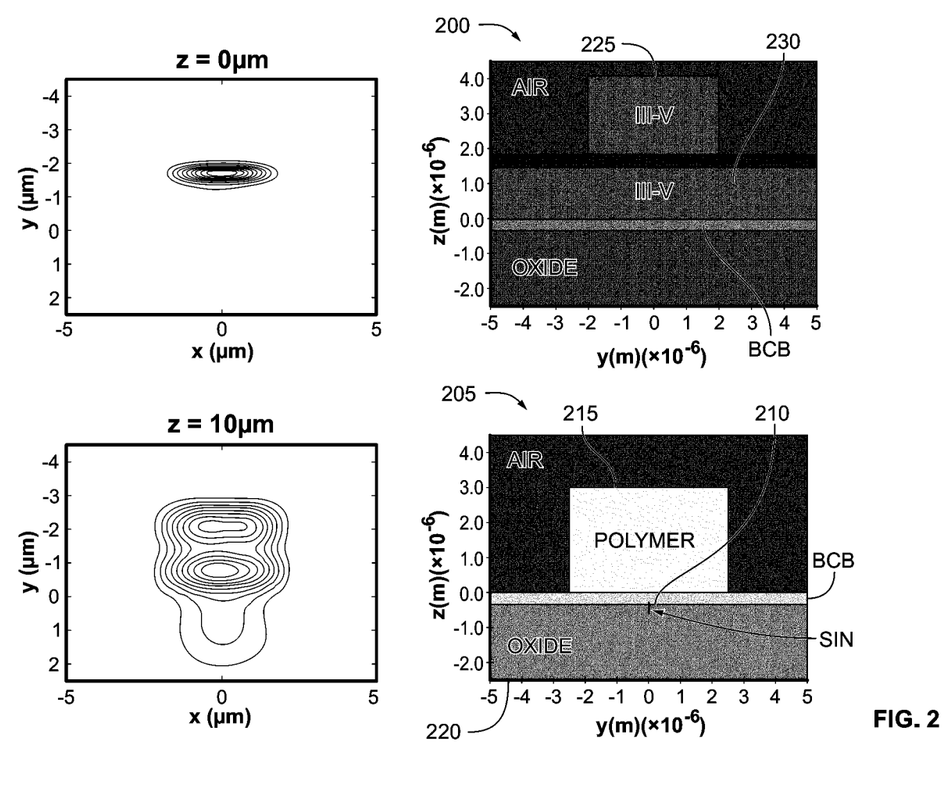
FIG. 2 shows contour plots at the longitudinal positions z=0 μm and z=10 μm. The interface between the III-V waveguide and the polymer waveguide is at z=0 μm. A cross-sectional view of the III-V waveguide is juxtaposed next to the z=0 μm contour plot, and a cross-sectional view of the polymer waveguide is juxtaposed next to the z=10 μm contour plot.
Figure 3A:
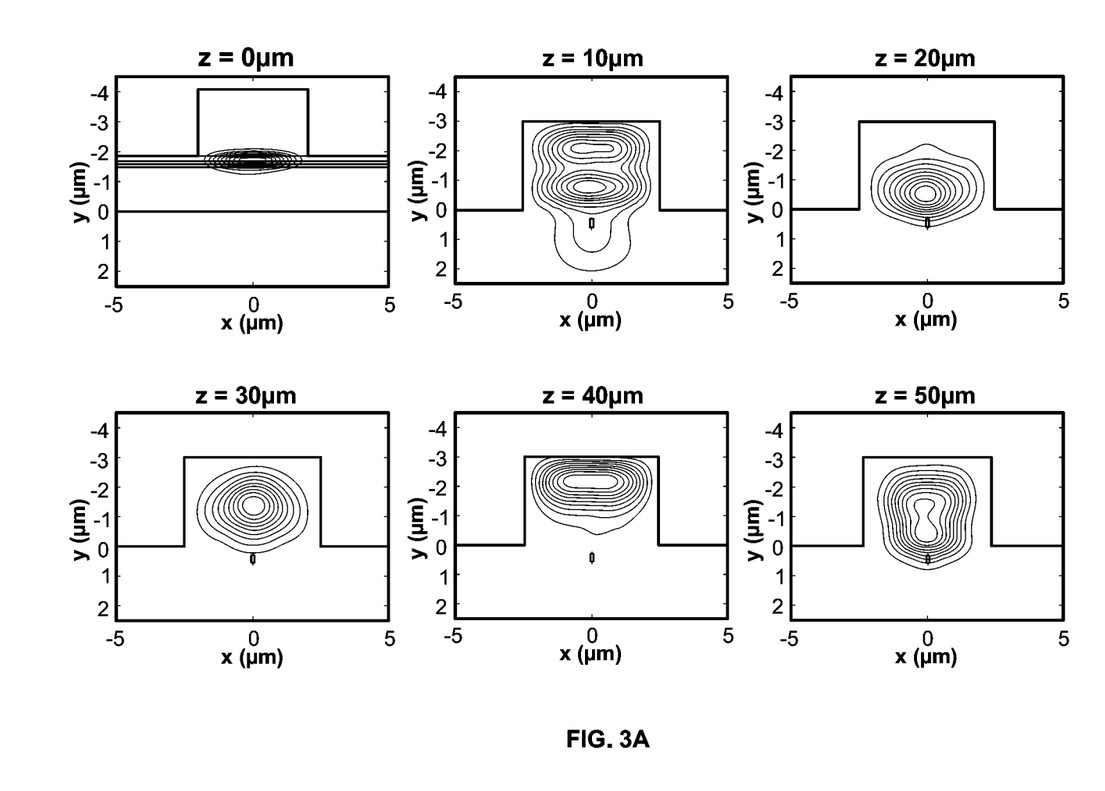
FIGS. 3A and 3B show a sequence of contour plots at respective values of the longitudinal coordinate z beginning at 0 μm and advancing in 10-μm increments to 190 μm.
Figure 3B:
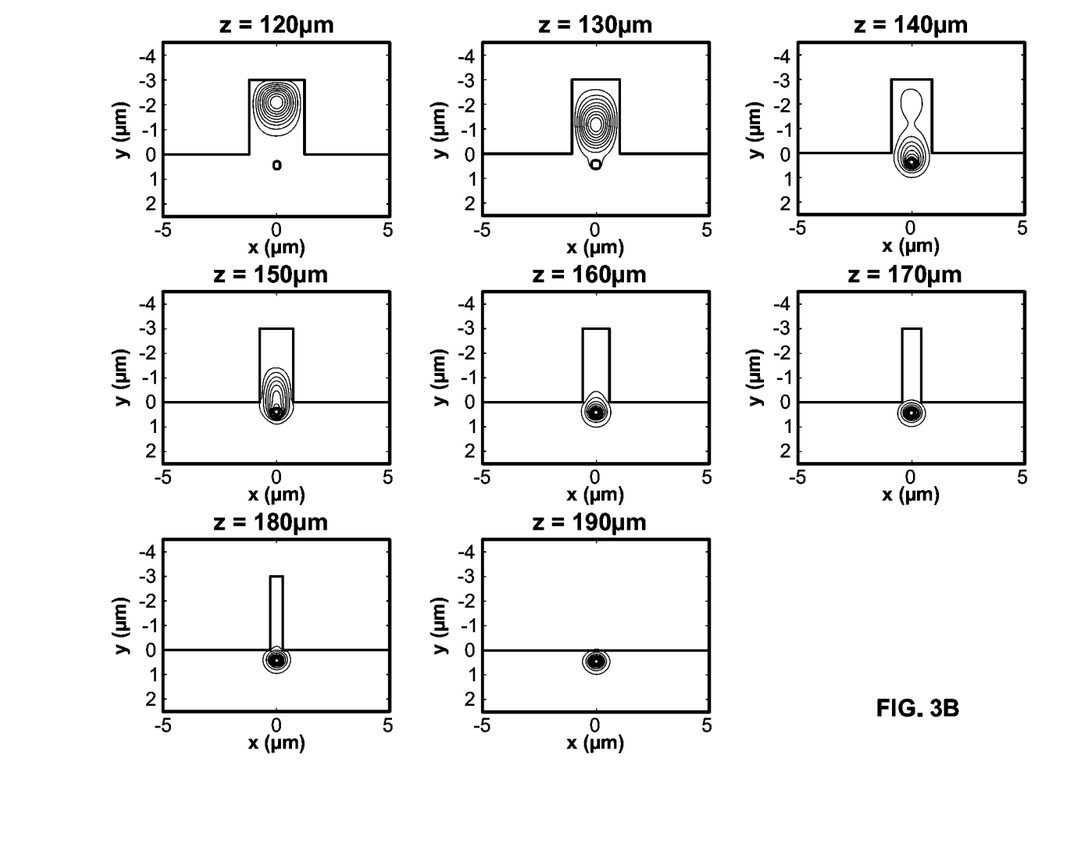

FIGS. 2, 3A, and 3B illustrate the transition of the optical mode from the upper polymer waveguide to the lower silicon-layer waveguide in an example of a double taper. In these figures, the mode profile within the waveguiding structure is shown in a cross-sectional contour plot at successive positions along the z-axis, which in the drawing is the longitudinal axis of the double taper. These figures were generated by numerical simulation.

Turning first to FIG. 2, contour plots will be seen at the longitudinal positions z=0 (upper view) and z=10 μm (lower view). The interface between the III-V waveguide and the polymer waveguide is at z=0 μm.

As seen in the figure, a cross-sectional view 200 of the III-V waveguide is juxtaposed next to the z=0 μm contour plot, and a cross-sectional view 205 of the polymer waveguide is juxtaposed next to the z=10 μm contour plot. In the example shown, the silicon-layer waveguide 210 is a silicon nitride (SiN) waveguide. It is shown underlying the polymer waveguide 215. In the particular type of design that is shown, the SiN waveguide is recessed into the $SiO_2$ lower cladding 220.

The contour plot for z=0 μm was calculated for a position slightly upstream of the interface, at z=−0.002 μm. The contour plot for z=0 μm shows that the calculation was made assuming that light was injected from the III-V waveguide 225 into the polymer waveguide at a height y of about 1.7 μm, which was a short distance above the midplane of the polymer waveguide. This height can be varied, for example by varying the thickness of the III-V undercladding 230. In design studies, the height where injection takes place can be varied to optimize the coupling efficiency. This is possible, at least in part, because the polymer waveguide behaves as a multimode interference (MMI) coupler. In particular, this MMI behavior facilitates the positioning of the injection point in the upper half of the polymer waveguide.

Turning next to FIGS. 3A and 3B, there will be seen a sequence of contour plots at the following respective values of the longitudinal coordinate z: 0 μm, 10 μm, 20 μm, 30 μm, 40 μm, 50 μm, 60 μm, 70 μm, 80 μm, 90 μm, 100 μm, 120 μm, 130 μm, 140 μm, 150 μm, 160 μm, 1700 μm, 180 μm, and 190 μm. It is evident in the figures that to effectuate the mode transfer between the upper and lower waveguides, the polymer waveguide becomes progressively narrower, while the SiN waveguide becomes progressively wider. The centroid of the mode profile is seen to fluctuate in its vertical position as the longitudinal propagation distance increases. This behavior is typical of an MMI coupler and is a consequence of the multimodal nature of the guided electromagnetic field.

Figure 4A:
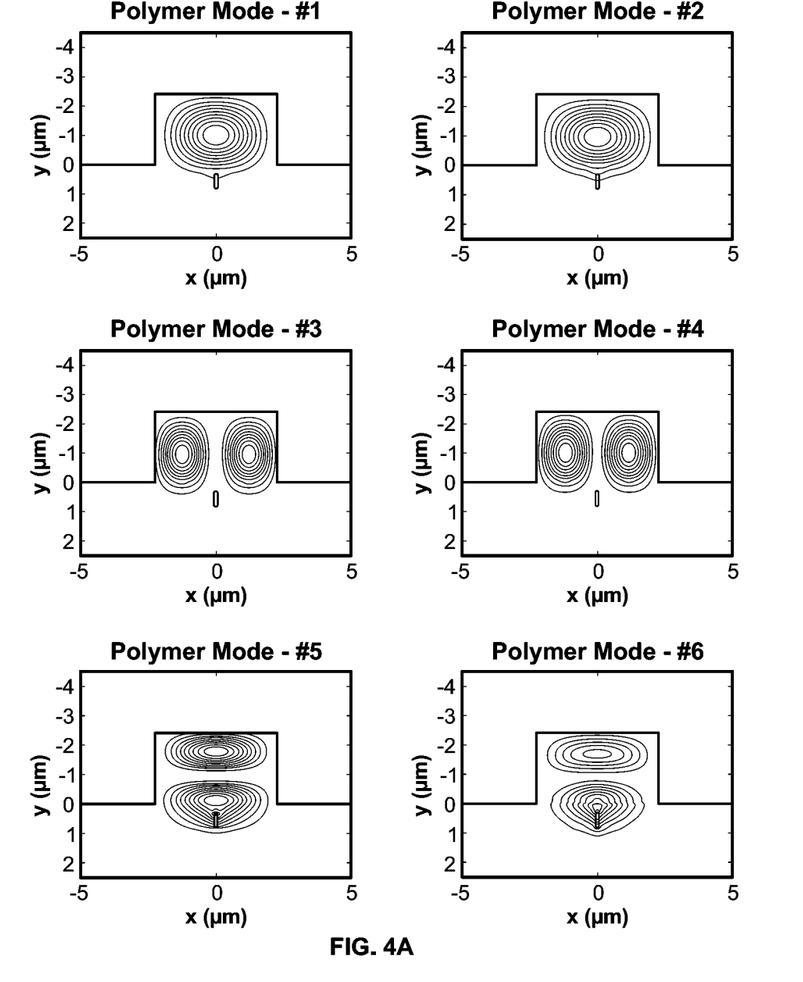
FIGS. 4A and 4B provide an illustration of the modal structure of the polymer waveguide in an example design. The figures show profiles for the first ten modes of the polymer waveguide. Each view is a cross-sectional contour plot of one of the modes at a longitudinal position z=0, i.e., just before the start of the taper.
Figure 4B:
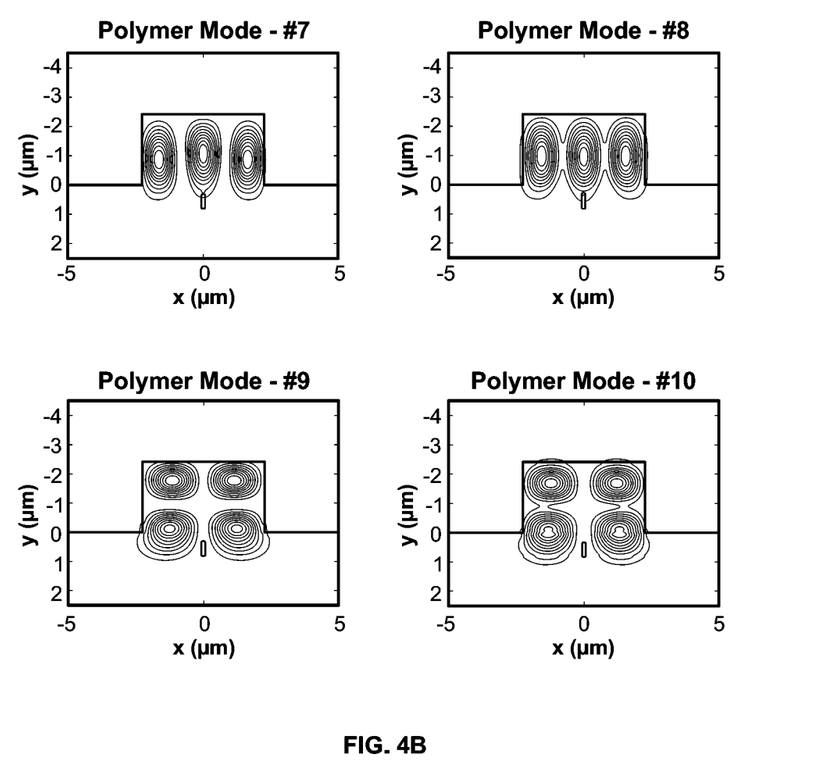

FIGS. 4A and 4B provide an illustration of the modal structure of the polymer waveguide in a design that includes a SiN waveguide recessed into an underlying $SiO_2$ lower cladding. The figures show profiles for the first ten modes of the polymer waveguide. Each view is a cross-sectional contour plot of one of the modes at z=0, i.e., just before the start of the taper.

Figure 5:
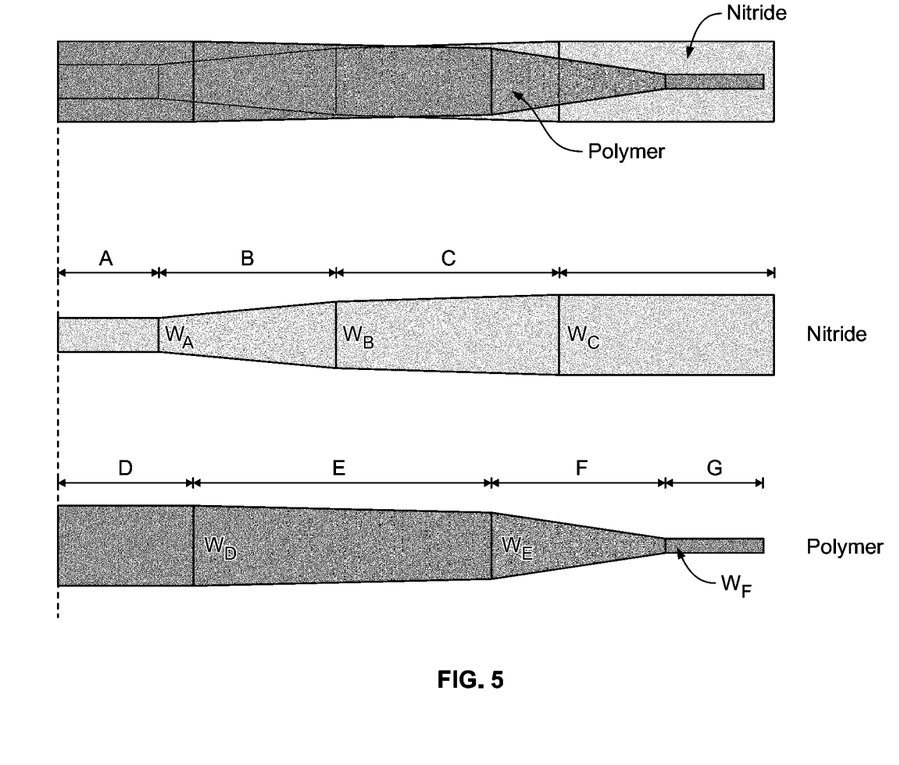
FIG. 5 provides three plan views of tapered waveguides according to device designs that are discussed here. The top view is a superposition of upper and lower waveguides. The middle view shows the lower waveguide only. The bottom view shows the upper waveguide only.

FIG. 5 is a diagram defining a set of dimensional parameters for a double taper. The double taper consists of an upper taper in the (intermediary) polymer waveguide, and a lower taper in the silicon-based waveguide. In the example described here, the silicon-based waveguide is made of silicon nitride (SiN).

There are three views in FIG. 5. The topmost view is a plan view of the complete double taper. The middle view is a plan view of the (lower) SiN taper only. The bottom view is a plan view of the (upper) polymer taper only. In each view, light is coupled to or from an upper-level III-V laser or modulator at the left-hand end of the taper, and light is coupled to or from the lower SiN waveguide at the right-hand end of the taper. For convenience, we will describe the optical propagation as directed from left to right. However, the designs presented here are bidirectional, and they would also support optical propagation from right to left.

As represented in the figure, the upper and lower tapers each consist of two straight (i.e., non-tapered) sections with a pair of juxtaposed linearly tapered sections between them.

It should be understood in this regard that the layout represented in FIG. 5 was the subject of a design study in which we varied several dimensional parameters in a search for an optimal design. We chose to use two, and not some other number, of linearly tapered sections per taper in order to strike a desired balance between design flexibility and tractability. The decision to taper these sections linearly, and not according to some other functional form, was made for the same reason. These choices should therefore be understood as exemplary only, and not as limiting.

As will be seen below, good results were obtained in at least one of our designs when the silicon nitride waveguide had only a single tapered section, which was linearly tapered.

With reference to the lower taper as shown in FIG. 5, the straight sections have widths $W_A$ on the left and $W_C$ on the right, and the left-hand straight section has a length A. The left-hand tapered section is shown as increasing in width from $W_A$ to $W_B$ over a distance B, and the right-hand tapered section is shown as increasing in width from $W_B$ to $W_C$ over a distance C.

With reference to the upper taper as shown in FIG. 5, the straight sections have widths WD on the left and $W_F$ on the right, with respective lengths D and G. The left-hand tapered section is shown as decreasing in width from $W_D$ to $W_E$ over a distance E, and the right-hand tapered section is shown as decreasing in width from $W_E$ to $W_F$ over a distance F.

Figure 6:
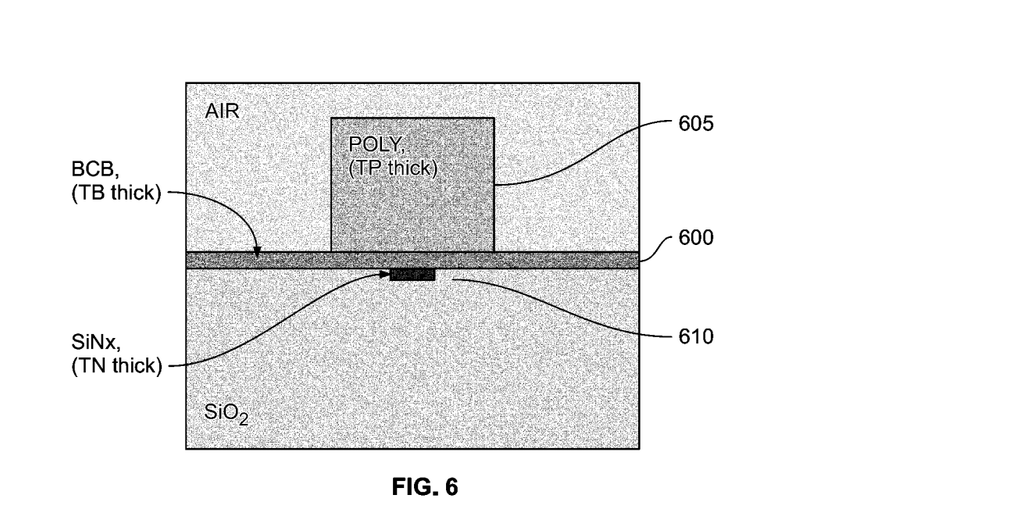
FIG. 6 is a cartoon view, in cross-section, of a lower waveguide according to device designs that are discussed here. The waveguide shown in the figure has an SiO2-type ridge.
Figure 7:
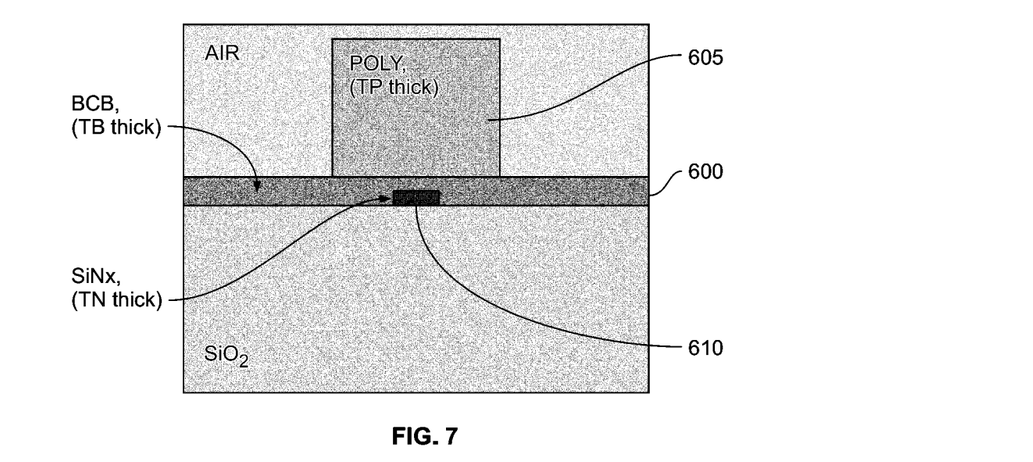
FIG. 7 is a cartoon view, in cross-section, of a lower waveguide according to device designs that are discussed here. The waveguide shown in the figure has an air-type ridge.

FIGS. 6 and 7 are drawings of the waveguide stack that constitutes the double taper. Both figures are cartoon drawings in cross-sectional view. Each illustrates a respective design variation characterized by the treatment of the polymer adhesive 600 (i.e., the BCB in these examples) at the interface between the upper waveguide 605 and the lower waveguide 610.

FIG. 6 illustrates a version in which the lower waveguide (i.e., the SiN waveguide in these examples) conforms to what we call an "$SiO_2$-type ridge". There, the SiN waveguide is recessed into the $SiO_2$ lower cladding so as to offer a flat interface to the BCB.

By contrast, FIG. 7 illustrates a version in which the lower waveguide conforms to what we call an "air-type ridge". There, the BCB surrounds the SiN waveguide on the top and both sides.

Table 1 presents the results of two optimized design studies that produced favorable results. All parameter values in the table are expressed in micrometers (μall). In addition to the parameters defined above, the table lists the thicknesses TP, TN, and TB of the polymer waveguide, the silicon nitride waveguide, and the BCB adhesion layer, respectively. For the air-type ridge design, the refractive indices of the SiN waveguide and the polymer waveguide were taken as 2 and 1.6, respectively. For the $SiO_2$-type ridge design, the refractive indices of the SiN waveguide and the polymer waveguide were taken as 1.989 and 1.57, respectively.

The study for the air-type ridge design was carried out using the finite-difference time-domain method (FDTD) for electromagnetic modeling. The optimized transmission of −0.254827 dB (averaged over a wavelength range of 1500-1600 nm) listed in the last line of the table does not include interfacial loss between the active III-V device and the polymer waveguide.

The study for the $SiO_2$-type ridge design was carried out using the Eigenfunction Expansion method for electromagnetic modeling. The optimized transmission of −0.506 dB reported in the table for that study includes the interfacial loss.

TABLE 1

Design Optimization:
Parameters and Final Results

| Parameter | $SiO_2$-type ridge | Air-type ridge |
|---|---|---|
| A | 38.7 | 0 |
| B | 141.4 | 300 |
| C | 0 | 300 |
| D | 38.7 | 0.1 |
| E | 141.4 | 34.441 |
| F | 2.035 | 4.5459 |
| G | 7.016 | 0 |
| WA | 0.039 | 0.1 |
| WB | 0.526 | 6 |
| WC | 0.526 | 1.2 |
| WD | 5 | 4.5124 |
| WE | 0.626 | 0.8893 |
| WF | 0.48 | 1.7734 |
| TP | 3 | 2.4087 |
| TN | 0.3 | 0.4853 |
| TB | 0.3 | 0.3129 |
| Transmission | −0.506 dB | −0.254827 dB |

With reference to Table 1, it will be seen that in the $SiO_2$-type ridge design, there is only a single linear taper in the silicon nitride waveguide (i.e., parameter C equals 0).

With further reference to the table, it will be seen that in the air-type ridge design, the first (i.e., left-hand) silicon nitride taper increases in width by a factor of sixty. That is, from left to right, it goes from a width WA=0.1 μm to a width WB=6 In the same design, it will be seen that the second (i.e., right-hand) silicon nitride waveguide is tapered back down from a width WB=6 μm to a width WC=1.2 μm. As noted above, the final width of 1.2 μm was advantageous for mating with PLC waveguides having standardized dimensions.

With still further reference to the table, it will be seen that in the air-type ridge design, going from left to right, the polymer taper starts at a width WD of 4.5124, decreases in width to WE=0.8893 μm, and then increases slightly in width to WF=1.7734 μm. The numerical optimization routine that we used was allowed to make the bottom taper very long, i.e. a total length of 600 μm. However, the 38-μm length of the upper taper in the resulting design was already sufficient to effectuate the transfer of light into the lower waveguide. Hence, most of the length of the bottom taper in the resulting design was of little significance to the device performance.

It is noteworthy that in the $SiO_2$-type ridge design of Table 1, the desired modal transformation was achieved with a silicon nitride taper length of only 141.4 μm (parameter B in the table). The corresponding total polymer taper length was 143.4 μm (the sum of parameter E and parameter F in the table). This implies that in an operating (vacuum) wavelength range of 1500-1600 nm, the modal conversion can be achieved within a total double taper length well under 200 μm.

In the air-type ridge design of Table 1, the desired modal conversion was achieved with a total taper length in silicon nitride of 600 μm (the sum of parameters B and C in the table), but a total taper length in the polymer waveguide of only 39.0 μm (the sum of parameters E and F in the table). This implies that in an operating (vacuum) wavelength range of 1500-1600 nm, the modal conversion can be achieved within an MMI coupler length (i.e., the length of the polymer waveguide) well under 100 μm, and in fact, well under 50 μm.

Another noteworthy feature of the optimized parameters listed in Table 1 relates to the thickness TP of the polymer waveguide. In the $SiO_2$-type ridge design, this thickness is 3 μm. In the air-type ridge design, it is 2.4 μm.

The intermediary waveguide of Roelkens 2006 is cited here for comparison. That waveguide had a polyimide core surrounded by a BCB cladding. (In our designs, air surrounded the polyimide core on the top and sides.) The thickness of the Roelkens core was designed for optimal coupling between the fundamental III-V waveguide mode and the polymer waveguide mode. For that purpose, the optimum polyimide thickness was found to be 1.3 μm (for 1550-nm operation).

By contrast, the III-V laser undercladding in example embodiments of our designs was about 2.5 μm thick. Concomitantly, we made the polyimide waveguide about 3 μm thick. This combination of dimensions positioned the laser emission for capture in the upper half of the polyimide waveguide.

Adjoint shape optimization. Adjoint shape optimization is a well-known technique for designing components for the control of fluid flow and electromagnetic propagation, among other things. To optimize a shape in order to engineer the propagation of light, for example, shape derivatives are computed throughout a problem space. The shape derivatives are calculated with an inverse algorithm that invokes an algorithm such as FDTD for solving Maxwell's Equations. By the adjoint method, shape derivatives can be computed with only two electromagnetic simulations per iteration. A gradient descent method is used to guide successive shape iterations.

We used adjoint shape optimization as an alternative method for generating taper designs. Through numerical simulation, we confirmed that this is a viable approach that is expected to generate designs with good performance. In an example, we used adjoint shape optimization to design a double taper for light at 1.55 μm. The lower waveguide was specified as silicon nitride, the upper waveguide was specified as polydimethylglutarimide (PMGI), the top cladding was specified as air, and the middle and lower claddings were specified as silicon dioxide, with silicon underlying the lower cladding. The initial point for the optimization had rectangular upper and lower tapers with respective lengths of 60 µm and 100 µm and an offset of 41 µm.

Figure 8:
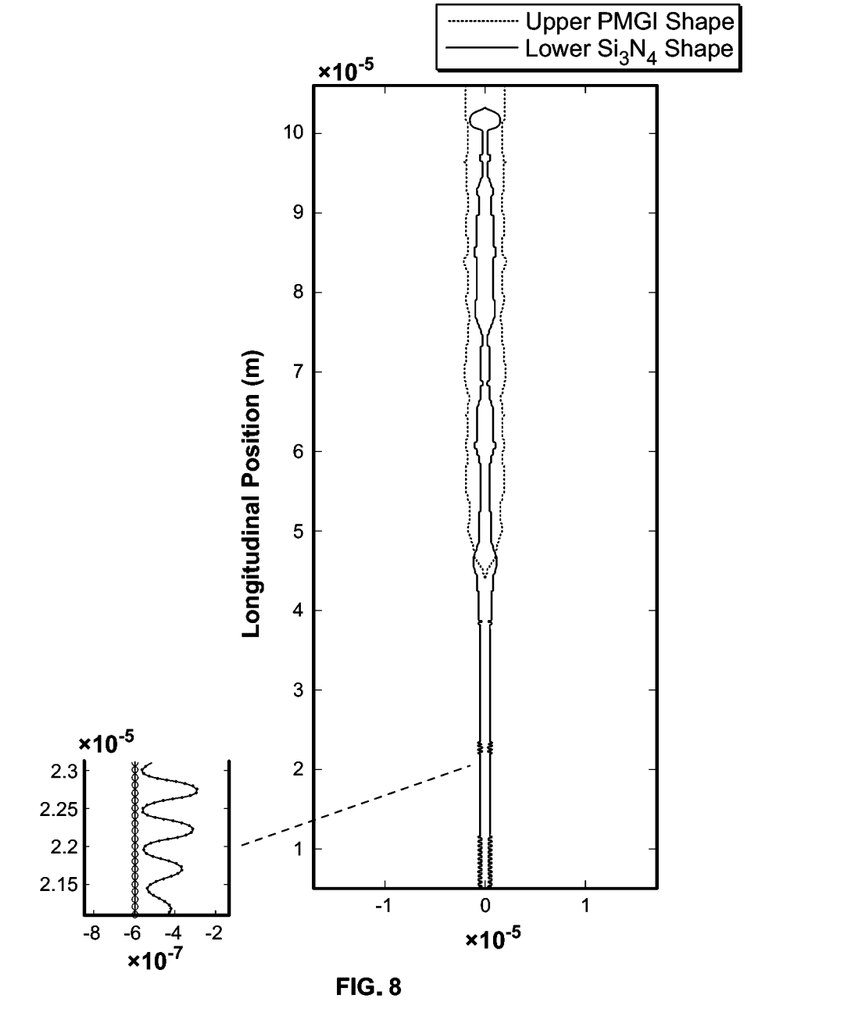
FIG. 8 is a schematic view of an example double taper designed by the method of adjoint shape optimization. An inset in the drawing shows a magnified detail of the lower taper.

Our final results after iteration 227 showed a through power of −1.064 dB (78.27%), a reflected power of −15.46 dB (2.84%), and a radiated power of −7.24 dB (18.89%). The final design is shown in FIG. 8, with an inset showing a detail of the lower taper. As is characteristic of designs created by adjoint shape optimization, the sidewalls of the upper and lower tapers exhibit an undulating pattern.

Fabrication. An example fabrication process begins with an SOI wafer and a III-V die. Silicon nitride waveguides are fabricated on the SOI wafer by LPCVD deposition of silicon nitride over a silicon dioxide lower cladding layer. The silicon nitride is then patterned with deep UV lithography and etched using, e.g., a reactive ion etching (RIE) process.

On the III-V die, the desired stack of epitaxial layers overlies a sacrificial substrate composed, for example, of indium phosphide. The top layer of the die is the n-type undercladding. The die is first patterned with ohmic contact metallization over the undercladding. The die is then flipped and bonded to the SOI wafer with BCB, with the undercladding facing the SOI wafer and the ohmic contact metal embedded in the BCB.

The sacrificial substrate is removed by selective wet etch. Then, the III-V die is patterned and etched down to the undercladding to define a waveguide rib. Adjacent the waveguide rib, a portion of the III-V stack is etched only far enough to expose the n-type undercladding for an electrical contact.

A top metal ohmic contact to the n-type undercladding is patterned and deposited. Thermal processing is applied to activate the ohmic contacts.

A layer of polyimide for the polymer waveguide is spin-coated onto the composite wafer, cured, patterned, and removed from over the III-V material. The polyimide waveguide is then defined and plasma-etched.

Roelkens 2006 describes a process of fabrication and heterointegration that bears similarities to the process described above, although the processes are not identical. Certain pertinent process details may be better understood with reference to the description in Roelkens 2006.

Figure 9:
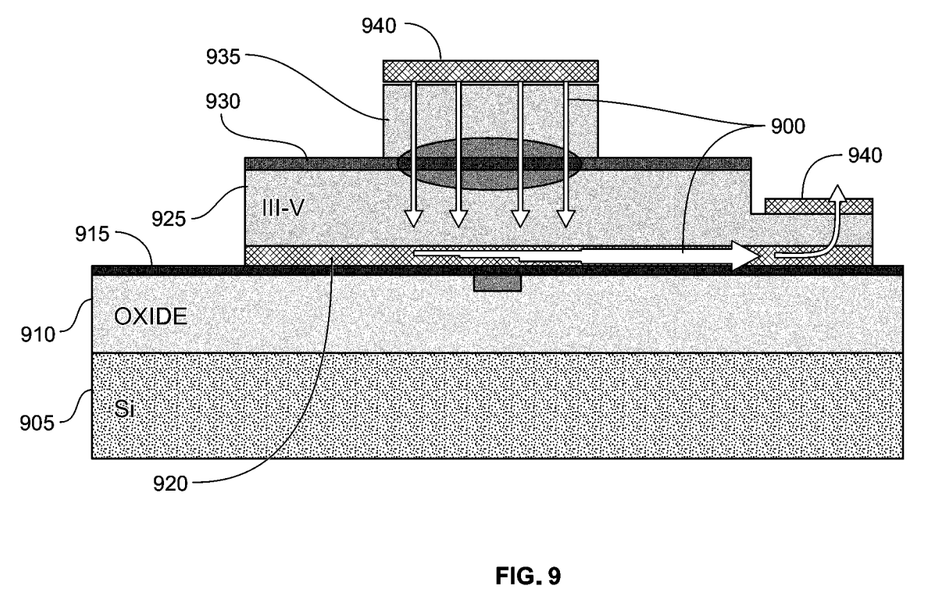
FIG. 9 is a cartoon view, in cross-section, of an example device of the kind described here. In the example embodiment that is shown, a metal film forms an ohmic contact to the bottom of the III-V component.

FIG. 9 is a cross-sectional cartoon drawing of an example device that may be fabricated by the process described above. Arrows 900 in the figure indicate electrical current paths in an example embodiment. Included in the figure are silicon wafer 905, oxide layer 910, bonding layer 915, ohmic metal underlayer 920, III-V undercladding 925, III-V core layer 930, upper III-V layer 935, and upper metal contacts 940. The polymer waveguide is not shown explicitly in FIG. 9.

Embodiments of our new designs can potentially overcome several drawbacks of more conventional designs. Some of the drawbacks that could be avoided by our designs include: inefficiency in laser operation due to the large resistive losses in currents that flow laterally through very thin semiconductor layers; optical losses on propagation paths that straddle the bond interface; and compromised laser performance caused by non-optimal optical gain confinement factors.

We claim:

1. Apparatus comprising:
   a silicon-based platform containing a silicon-based waveguide;
   an introduced semiconductor device heterointegrated on the silicon-based platform; and
   a polymeric waveguide optically coupled to the introduced semiconductor device and overlying at least a portion of the silicon-based waveguide, wherein:
   the polymeric waveguide is conformed as a multimode interference (MMI) coupler between the introduced semiconductor device and the silicon-based waveguide; and
   at least the polymeric waveguide is tapered with a shape that effectuates optical coupling to the silicon-based waveguide.

2. The apparatus of claim 1, wherein the introduced semiconductor device is an active III-V optoelectronic device.

3. The apparatus of claim 1, wherein the introduced semiconductor device is a III-V laser.

4. The apparatus of claim 1, wherein an adhesion layer joins the introduced III-V device to the silicon-based platform.

5. The apparatus of claim 1, wherein the polymeric waveguide comprises polyimide.

6. The apparatus of claim 1, wherein both the polymeric waveguide and the silicon-based waveguide are tapered with shapes that effectuate optical coupling between said polymeric waveguide and said silicon-based waveguide.

7. The apparatus of claim 1, wherein the silicon-based waveguide comprises silicon nitride.

8. The apparatus of claim 1, wherein the polymeric waveguide is arranged for lateral optical coupling with the introduced semiconductor device and for vertical optical coupling with the silicon-based waveguide.

9. The apparatus of claim 1, wherein the polymeric waveguide has a horizontal midplane and is arranged such that optical coupling between the polymeric waveguide and the introduced semiconductor device is effectuated principally at a height above the midplane.

10. The apparatus of claim 1, wherein:
    the introduced semiconductor device is a III-V laser with at least one operating frequency;
    the introduced semiconductor device has an undercladding with a thickness $\tau$;
    light at the operating frequency has an in-material wavelength $\lambda_m$ within the undercladding; and
    the thickness $\tau$ is at least twice the wavelength $\lambda_m$.

11. The apparatus of claim 1, wherein the introduced semiconductor device comprises an undercladding and a metal contact layer that underlies the undercladding.

12. The apparatus of claim 1, wherein the taper is less than 200 µm long.

13. The apparatus of claim 1, wherein the taper is less than 100 µm long.

14. The apparatus of claim 1, wherein the introduced semiconductor device is a III-V laser adapted for operation in the wavelength range from 1.5 µm to 1.6 µm, and wherein the taper is less than 200 µm long.

15. The apparatus of claim 1, wherein the introduced semiconductor device is a III-V laser adapted for operation in the wavelength range from 1.5 µm to 1.6 µm, and wherein the taper is less than 100 µm long.

16. The apparatus of claim 1, wherein the taper is non-adiabatic.

17. The apparatus of claim 1, wherein the polymeric waveguide and the silicon-based waveguide are both tapered with non-adiabatic tapers that effectuate optical coupling between said polymeric waveguide and said silicon-based waveguide.

18. The apparatus of claim 1, wherein the shape that effectuates optical coupling to the silicon-based waveguide has undulant sidewalls.

19. The apparatus of claim 18, wherein the shape having undulant sidewalls is a product of adjoint shape optimization.

\* \* \* \* \*